(12) United States Patent
Otani et al.

(10) Patent No.: US 7,525,674 B2
(45) Date of Patent: Apr. 28, 2009

(54) PRINT CONTROL DATA GENERATING APPARATUS, PRINT SYSTEM, PRINTER, AND PRINT CONTROL DATA GENERATING METHOD

(75) Inventors: Tsutomu Otani, Nagano (JP); Glen Petrie, Hillsboro, OR (US)

(73) Assignee: Seiko Epson Corporation, Tokyo (JP)

( * ) Notice: Subject to any disclaimer, the term of this patent is extended or adjusted under 35 U.S.C. 154(b) by 603 days.

(21) Appl. No.: 11/103,485

(22) Filed: Apr. 12, 2005

(65) Prior Publication Data

US 2006/0227158 A1 Oct. 12, 2006

(51) Int. Cl.
*G06F 1/12* (2006.01)
(52) U.S. Cl. .................. 358/1.1; 358/2.1; 358/448; 347/14; 382/173; 382/176
(58) Field of Classification Search ............. 358/448, 358/1.1, 2.1; 347/17; 382/173, 176
See application file for complete search history.

(56) References Cited

U.S. PATENT DOCUMENTS 5,487,172 A * 1/1996 Hyatt ...................... 712/32
6,614,564 B1 * 9/2003 Sakaguchi ................ 358/487
7,010,176 B2 * 3/2006 Kusunoki ................. 382/299
7,011,383 B2 * 3/2006 Edwards et al. ............ 347/16
7,224,482 B2 * 5/2007 Shima ..................... 358/1.18
2003/0179928 A1 * 9/2003 Kusama et al. ............ 382/180
2004/0012796 A1 * 1/2004 Matsuyama .............. 358/1.2
2005/0099644 A1 * 5/2005 Nomoto et al. ............ 358/1.12
2006/0169161 A1 * 8/2006 Endo ...................... 101/484

FOREIGN PATENT DOCUMENTS

| EP | 1186993 A2 * | 3/2002 |
| EP | 1293349 A2 * | 3/2003 |
| JP | 2004-157612 A | 6/2004 |

* cited by examiner

*Primary Examiner*—Mark K Zimmerman
*Assistant Examiner*—Miya J Cato
(74) *Attorney, Agent, or Firm*—Sughrue Mion, PLLC (57) ABSTRACT

A print control data generating apparatus includes: a print image generator that generates a first print image having a size not larger than that of a print paper as a print image in a marginless printing; a print image modification unit that generates outside print images provided outside of the first print image generated by the print image generator based on a periphery of the first print image, to generate a second print image having a size larger than that of the print paper; and a print control data generator that generates print control data used in print control of a printer based on the second print image.

3 Claims, 9 Drawing Sheets

IN CASE THAT PAPER DEVIATION IS NOT GENERATED

FIG. 7B

IN CASE THAT PAPER IS DEVIATED TO LEFT SIDE OF PRINT IMAGE

PAPER SIZE

FIG. 9C

PAPER SIZE

PRINT CONTROL DATA GENERATING APPARATUS, PRINT SYSTEM, PRINTER, AND PRINT CONTROL DATA GENERATING METHOD

BACKGROUND OF THE INVENTION

The present invention relates to a print control data generating apparatus, a print system, a printer, and a print control data generating method.

Patent document 1 discloses an information processing apparatus for supplying a print data to a printer. In order to make a printer perform a marginless printing, this information processing apparatus applies edge images each having a predetermined size and color (for example, black) to four peripheral sides of an image which is the print object, determines the print start position of a recording paper set in the printer, to a position separated from the top position of the recording paper to the outside of the recording paper by a distance according to the size of the edge image, and generates a print data to be transmitted to the printer based on the image of the print object to which the edge images are applied and the determined print start position.

In the information processing apparatus of Patent Document 1, by applying the edge images each having a predetermined size and color (for example, black) to the four peripheral sides of the image to be printed and then printing the image by the printer, in the marginless printing, any defect is not generated in the printed image and a portion which the image is not printed at the periphery of the paper can be prevented from being formed.

Patent Document 1: Japanese Unexamined Patent Publication No. 2004-157612

However, in the case of using the information processing apparatus in Patent document 1, if the conveyance of the paper is deviated, the edge image applied to the four peripheral sides of the image is printed at the periphery of the paper. For example, when the added edge images each is a single colored image such as a black image and is not related to the image to be printed, the printed image is discontinuous at the boundaries between the image to be printed and the edge images and thus a feeling of uncomfortable feeling is given to a user.

SUMMARY OF THE INVENTION

An object of the present invention is to provide a print control data generating apparatus, a print system, a printer and a print control data generating method, by which any defect is not generated in the printed image, the portion which the image is not printed at the periphery of the paper can be prevented from being formed without giving the uncomfortable feeling to the user.

In order to solve the aforesaid object, the invention is characterized by having the following arrangement.

(1) A print control data generating apparatus comprising: a print image generator that generates a first print image having a size not larger than that of a print paper as a print image in a marginless printing;

a print image modification unit that generates outside print images provided outside of the first print image generated by the print image generator based on a periphery of the first print image, to generate a second print image having a size larger than that of the print paper; and a print control data generator that generates print control data used in print control of a printer based on the second print image.

(2) The apparatus according to (1), wherein the print image generator generates the first print image having the same size as that in a margin printing.

(3) The apparatus according to (1), wherein the print image modification unit extrapolates the same images as the periphery of the first print image to the outside of the first print image to generate the second print image having the size larger than that of the print paper.

(4) The apparatus according to (1), wherein the print image modification unit extrapolates a pattern of the peripheries of the first print image to the outside of the first print image to generate the second print image having the size larger than that of the print paper.

(5) A print system comprising:

the print control data generating apparatus according to any one of claims 1 to 3; and a printing device that prints the second print image on the print paper based on the print control data generated by the print control data generating apparatus.

(6) A printer comprising:

the print control data generating apparatus according to any one of claims 1 to 3; and a printing device that prints the second print image on the print paper based on the print control data generated by the print control data generating apparatus.

(7) A printer comprising:

a print control data generator that generates, based a first print control data which is generated in a marginless printing and which corresponds to a first print image having a size not larger than that of a print paper, a second print control data corresponding to a second print image having a size larger than that of the print paper; and a printing device that prints the second print image based on the second print control data.

(8) A method of generating print control data comprising:

generating a first print image having a size not larger than that of a print paper as a print image in a marginless printing;

generating outside print images of the first print image based on a periphery of the first print image to generate a second print image having a size larger than that of the print paper; and generating print control data used in print control of a printer based on the second print image.

With the structure of (1), the images generated based on the peripheries of the first print image are added to the outside of the first print image having the size not larger than that of the print paper. Accordingly, although the print is deviated, the images continuous with the first print image are printed at the periphery of the paper. At the result, an uncomfortable feeling is not given to the user, the defect of the printed image is not generated, and the portion which the image is not printed on the periphery of the paper is prevented from being formed.

With the structure of (2), the first print image having the same size is generated, whether the marginless printing or the margin printing is performed and thus the print image generator can be simply realized.

With the structure of (3), the print image having the size larger than that of the print paper, which is used in the marginless printing, can be generated by a simple operation.

With the structure of (4), the second print image having the size larger than that of the print paper, which is used in the marginless printing, can be generated without a feeling of physical disorder.

With the structure of (5), the images generated based on the peripheries of the first print image are added to the outside of the first print image having the size not larger than that of the print paper. Accordingly, although the print is deviated, the images continuous with the first print image are printed at the periphery of the paper. At the result, an uncomfortable feeling is not given to the user, the defect of the printed image is not generated, and the portion which the image is not printed on the periphery of the paper is prevented from being formed.

With the structure of (6), the images generated based on the peripheries of the first print image are added to the outside of the first print image having the size not larger than that of the print paper. Accordingly, although the print is deviated, the images continuous with the first print image are printed at the periphery of the paper. At the result, an uncomfortable feeling is not given to the user, the defect of the printed image is not generated, and the portion which the image is not printed on the periphery of the paper is prevented from being formed.

With the structure of (7), the second print control data corresponding to the second print image having the size larger than that of the print paper is generated from the first print control data corresponding to the first print image having the size not larger than that of the print paper. Accordingly, although the print is deviated, the images continuous with the first print image are printed at the periphery of the paper. At the result, an uncomfortable feeling is not given to the user, the defect of the printed image is not generated, and the portion which the image is not printed on the periphery of the paper is prevented from being formed.

With the method structure of (8), the images generated based on the periphery of the first print image are added to the outside of the first print image having the size not larger than that of the print paper. Accordingly, although the print is deviated, the images continuous with the first print image are printed at the periphery of the paper. At the result, an uncomfortable feeling is not given to the user, the defect of the printed image is not generated, and the portion which the image is not printed on the periphery of the paper is prevented from being formed.

DETAILED DESCRIPTION OF PREFERRED EMBODIMENTS

Hereinafter, a print control data generating apparatus, a print system, a printer and a print control data generating method according to the embodiments of the present invention will be described with reference to the attached drawings. For example, the print system including a computer and a printer will be described. The print control data generating apparatus will be described as a portion of the computer. The print control data generating method will be described as a portion of the operation of the computer.

First Embodiment

Figure 1:
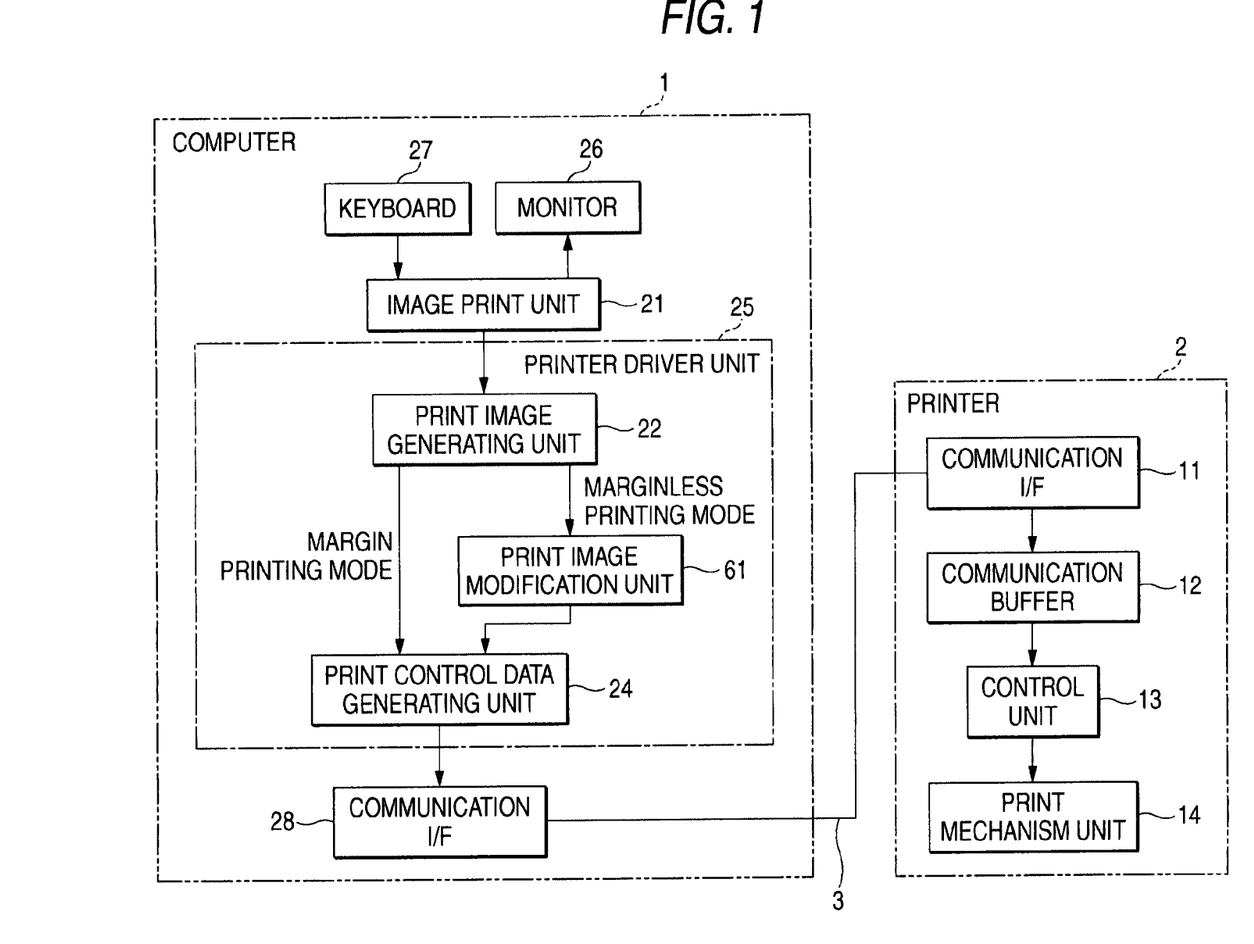
FIG. 1 is a block diagram of a print system according to a first embodiment.

FIG. 1 is a block diagram of a print system related to a first embodiment. The print system related to the first embodiment includes a computer 1 as the print control data generating apparatus, a printer 2, and a cable 3 for connecting them. The computer 1 and the printer 2 may be connected by a wireless communication.

The printer 2 includes, for example, a communication I/F (interface) 11 such as a USB (Universal Serial Bus) or a parallel interface, a communication buffer 12, a control unit 13 and a print mechanism unit 14 as a printer.

The communication I/F 11 of the printer 2 is connected with the cable 3. The communication I/F 11 stores the data received from the computer 1 through the cable 3 in the communication buffer 12.

As the data which is transmitted to the printer 2 by the computer 1, there is, for example, a print control data for printing an image in a predetermined paper. In the print control data, commands or data to be processed by the printer 2 are arranged in processed order. As languages used for describing the print control data, for example, there are the page describing languages such as ESC/P, ESC/Page, PostScript, HP-PCL, LIPS, and PRESCRIBE.

The control unit 13 obtains the received data stored in the communication buffer 12 and executes the control according to the obtained data. In case that the print control data is stored in the communication buffer 12, the control unit 13 controls the print mechanism unit 14 based on the print control data.

The print control unit 14 has a feeding mechanism for feeding paper laid in a paper tray (not shown) to a discharge tray (not shown) and a printing mechanism for applying ink or toner to the paper in the feeding path of the paper. Hereinafter, the position at which the ink or the toner is attached to this paper is referred to as the print position. The maximum size of the paper which can be fed by the feeding mechanism is determined for each printer 2. For example, the maximum size of the paper that can be fed is generally an A4 size in the home printer 2.

Figure 2:
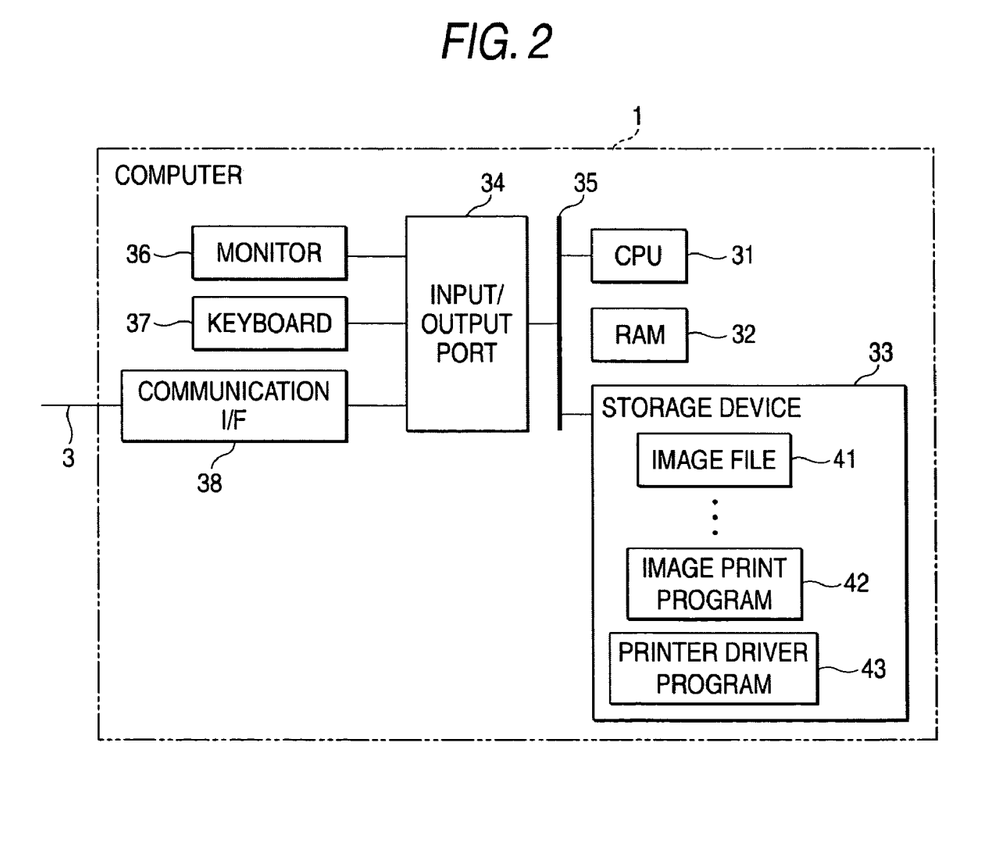
FIG. 2 is a block diagram of a hardware structure of a computer.

FIG. 2 is a block diagram of a hardware structure of the computer 1 illustrated in FIG. 1. The computer 1 has a CPU (Central Processing Unit) 31, a RAM (Random Access Memory) 32, a storage device 33, an input/output port 34, and a system bus 35 for connecting them. The input/output port 34 is connected with a monitor 36, a keyboard 37 and a communication I/F 38 such as a USB (Universal Serial Bus) or a parallel interface.

The communication I/F 38 of the computer 1 is connected with the cable 3. The communication I/F 38 transmits/receives the communication data to/from the communication I/F 11 of the printer 2 through the cable 3.

The storage device 33 is composed of a semiconductor memory and a hard disk drive and the like. The storage device 33 stores a plurality of image files 41, an image print program 42 and a printer driver program 43.

The image file 41 is a file having image data. As the file having the image data, there is, for example, an image file 41 of a plurality of EXIFs (Exchangeable Image File Format) taken by a DSC (Digital Still Camera) (not shown).

The central processing unit 31 reads the program stored in the storage device 33 into a RAM 32 and executes the programs. The central processing unit 31 executes the image print program 42 so that an image print unit 21 is realized as shown in FIG. 1. The central processing unit 31 executes the printer driver program 43 so that a printer driver unit 25 having a print image generating unit 22 as a print image generator, a print image modification unit 23 as a print image modification unit and a print control data generating unit 24 as a print control data generator is realized. The image print program 42 may be a kind of application program executed on an OS (Operating System) of the computer 1.

The image print program 42 or the printer driver program 43 may be stored in the storage device 33 upon the delivery of the computer 1 and may be stored in the storage device 33 after the delivery of the computer 1. In case that these programs 42 and 43 are stored in the storage device 33 after the delivery of the computer 1, these programs 42 and 43 may be stored by reading the program stored in the computer-readable recording medium such as CD-ROM (Compact Disc Read Only Memory) by the computer 1 and may be stored by downloading the program from a server to the computer 1 through a transmission medium such as Internet.

The image print unit 21 selects an image to be printed (image file 41) according to a GUI (Graphical User Interface) realized by the monitor 36 and the keyboard 37. Further, the image print unit 21 displays a print condition setting screen in the monitor 36 and supplies the information of the print condition selected in the screen to the print image generating unit.

Figure 3:
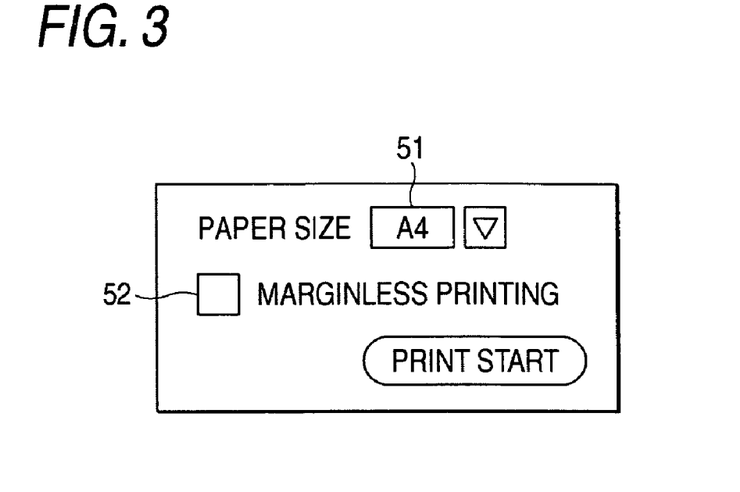
FIG. 3 illustrates an example of a print condition setting screen displayed in a monitor.

FIG. 3 illustrates an example of the print condition setting screen displayed in the monitor 36 illustrated in FIG. 1. In the print condition setting screen, a box 51 for displaying the selected paper size and a check box 52 checked in the case of performing the marginless printing are displayed. In this case, the user operates these boxes 51, 52 using the keyboard 37 so that the size of the printed paper can be selected and it is possible to determine whether the print is performed on the paper without a margin or not.

The printer driver unit 25 generates a print image from the image data of the image file 41 and generates the print control data used for performing the print by the printer 2 based on the print image. The operation mode of the printer driver unit 25 includes a marginless printing mode and a margin printing mode. The marginless printing mode is the operation mode when the image is printed on the paper without a margin. The margin printing mode is the operation mode when the image is printed on the paper with the margin. The margin printing mode is the general print mode.

In the printer driver unit 25, the print image generating unit 22 generates the print image for printing the image selected by the image print unit 21 (under the specified print condition). The print image is generated for each printed paper.

In addition, the print image generating unit 22 has various parameter information to be necessarily set for performing the print by the printer 2. As the parameter information, there is information such as a correspondence relationship between a type of print paper and a size of the print image.

Figure 4:
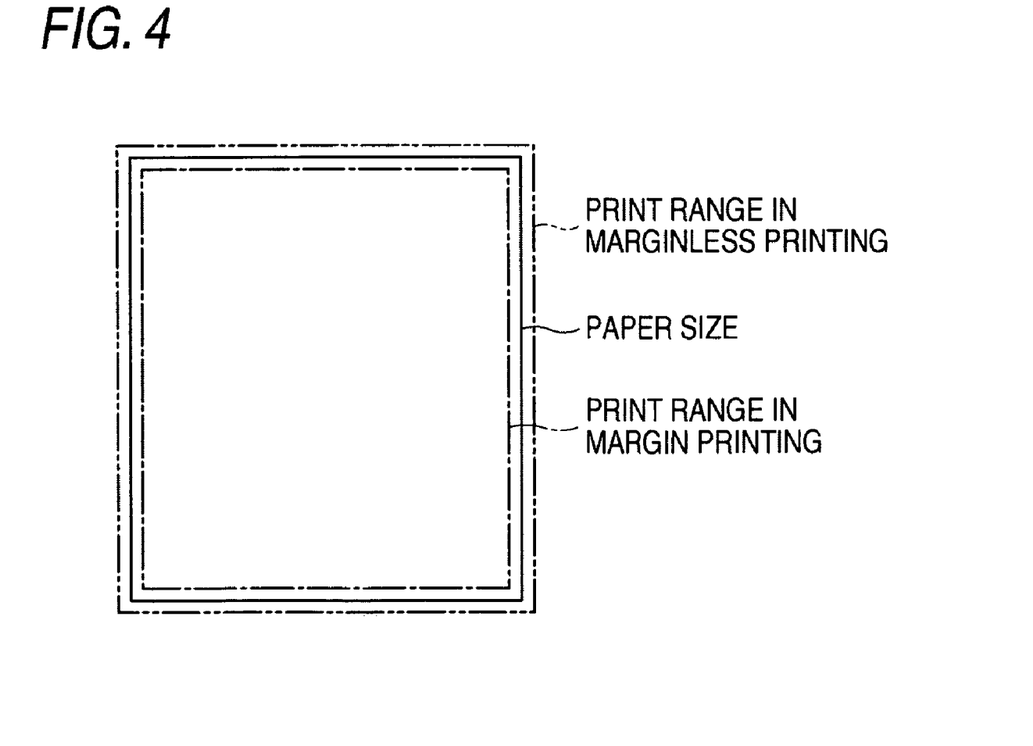
FIG. 4 illustrates a correspondence relationship between a paper and two print ranges.

FIG. 4 illustrates, for example, the relationship between the paper having A4 size and two print ranges. The size of the paper in FIG. 4 is indicated by the solid line. The printer 2 operates so that the toner or the ink is attached to the paper in the print ranges.

In case that the margin printing is performed on the paper having A4 size, the print range in the margin printing is set to be not larger than the size of the paper, as shown by one-dotted chain line of FIG. 4.

In addition, in case that the marginless printing is performed on the paper having A4 size, the print range in the marginless printing is set to larger than the size of the paper, as shown by two-dotted chain line of FIG. 4. Supposing that the position of the paper at the print position is deviated by at most 3 mm by the movement of the paper in the printer 2, margin of 3 mm or more is ensured as the interval from the each periphery of paper to the each periphery of each print range.

In the first embodiment, in case the margin printing is perform on the paper of A4 size, the print image of the same size as the print range (shown by the one-dotted chain line of FIG. 4) is generated and, in case that the marginless printing is performed on the paper having A4 size, the print image of the same size as the A4 paper (as shown by the solid line) is generated.

The print image modification unit 23 modifies the print image supplied to the printer driver unit 25 in the marginless printing mode. The print image modification unit 23 extrapolates the periphery of the print image supplied to the printer driver unit 25 with the below-mentioned compensating data and generates, as the modified print image, the print image having the size in the print range (the two-dotted chain line of FIG. 4) in case the marginless printing is performed on the paper having A4 size.

The print control data generating unit 24 generates the print control data based on the print image and outputs the data to the communication I/F 38.

Next, the operation of the print system will be described. In the below description, a print process of printing the image stored in the storage device 33 on the paper having A4 size without the margin will be described as an example.

The image print unit 21 of the computer 1 reads the image file 41 from the storage device 33 and displays the image according to the image data of the image file 41 in the monitor 36. The image print unit 21 may connect the DSC to the computer 1, read the image data of the image file 41 stored in the DSC and display the image based on the image data in the monitor 36.

In the state that the image is displayed in the monitor 36, the user operates the keyboard 37. The keyboard 37 outputs the input data according to the user operation. The image print unit 21 selects the image to be printed from the images displayed in the monitor 35 based on the input data of the image selecting operation.

If the image to be printed is selected, the print image generating unit 22 displays, for example, the print condition setting screen shown in FIG. 3 in the monitor 36.

For example, if the user operates the keyboard 37 in the state that the print condition setting screen shown in FIG. 3 is displayed in the monitor 36, the print image generating unit 22 selects the print condition according to the operation. In case that marginless printing is performed on the paper having the A4 size, the print image generating unit 22 specifies the size of the print image in case that the marginless printing is performed on the paper having the A4 size. If the paper having the A4 size is selected and the marginless printing is selected, the print image generating unit 22 sets the same size as the paper having the A4 size shown by the solid line of FIG. 4 as the size of the print image.

The print image generating unit 22 reads the image data of the image file 41 corresponding to the image selected by the image print unit 21 and generates the print image which is printed with the size of the print image from the image data.

Figure 5A:
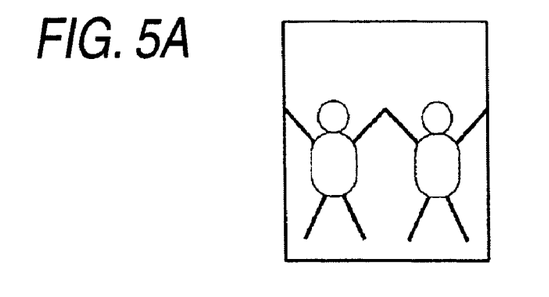
FIGS. 5A to 5D illustrate a correspondence relationship between a printed image and various print images.
Figure 5B:
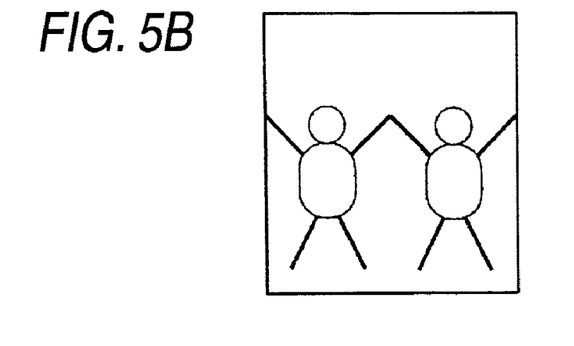
Figure 5C:
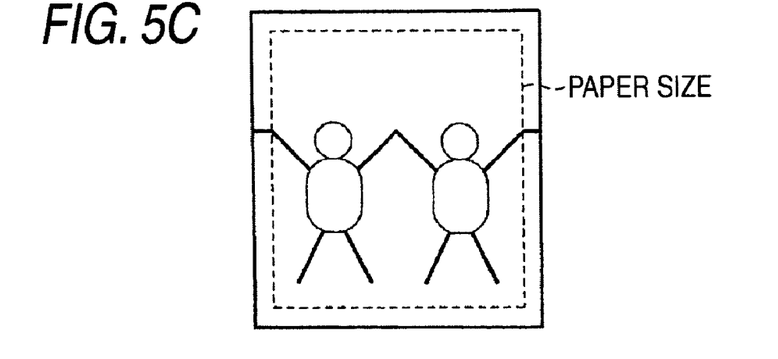
Figure 5D:
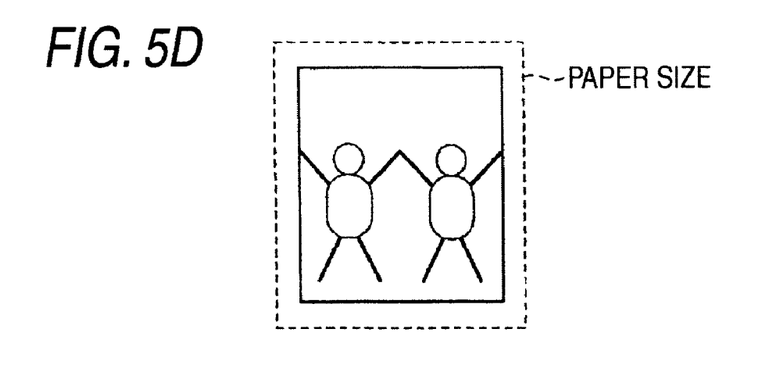

FIGS. 5A to 5D illustrate the correspondence relationship between the image to be printed and various print images generated based on the image. FIG. 5A is the image which is the print object, FIG. 5B is the print image generated by the print image generating unit 22 in case that the marginless printing is performed on the paper having A4 size, and FIG. 5C is the print image modified by the print image modification unit 23 in case that the marginless printing is performed on the paper having A4 size. FIG. 5D is the print image generated by the print image generating unit 22 in case that the margin printing is performed on the paper having A4 size. In FIGS. 5C and 5D, the size of the paper is shown by the dotted line.

In case that the image of FIG. 5A is printed without the margin, the print image generating unit 22 generates the print image having the same size as the paper (See FIG. 5B). Further, the print image modification unit 23 modifyies the print image generated by the print image generating unit 22.

Figure 6A:
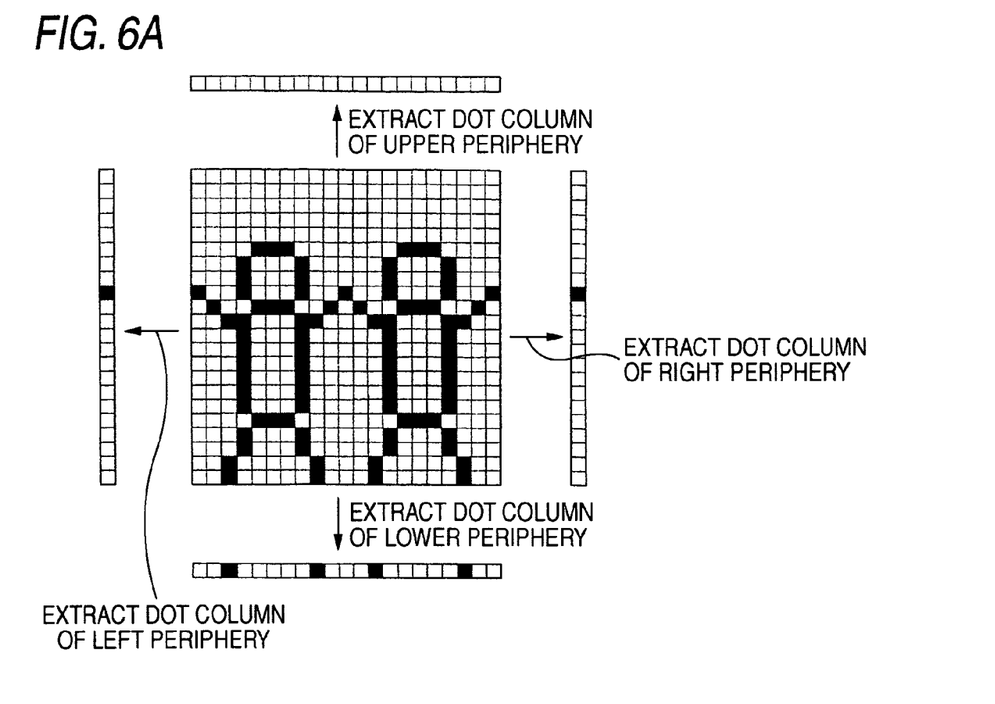
FIGS. 6A and 6B illustrate a print image process according to a print image modification unit.
Figure 6B:
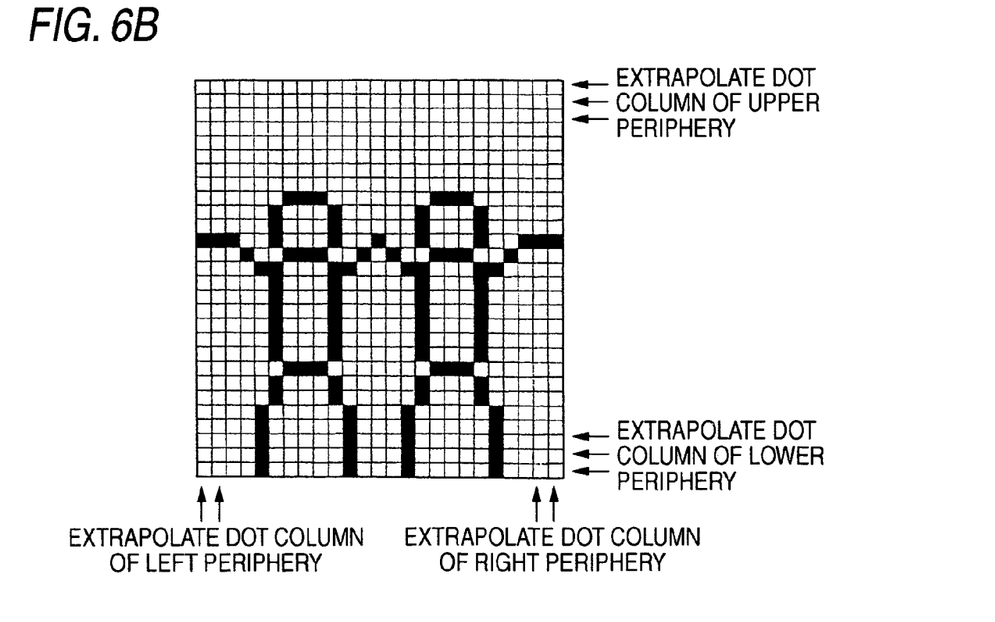

FIGS. 6A and 6B illustrates the print image process by the print image modification unit 23. FIG. 6A illustrates the print image generated by the print image generating unit 22 in the case of the marginless printing and the process of the print image modification unit 23 based on the print image. FIG. 6B illustrates the print image which is generated as a final print image by the print image modification unit 23 in the case of the marginless printing.

The print image modification unit 23 extracts one dot column of each of the peripheries from the print image supplied as shown in FIG. 6A. The print image modification unit 23 adds dot columns having the same pixel value as the extracted dot columns to the periphery of the print image, as shown in FIG. 6B.

After adding the dot columns to the four sides of the print image, the print image modification unit 23 adds the dots having the same pixel value as the right and left end dots of each dot column which is added to the upper and lower sides to the right and left sides and adds the dots having the same pixel value as the upper and lower end dots which is added to the right and left sides to the upper and lower sides, such that the contour of the print image has the rectangular shape equal to that of the paper.

Thereby, the print image having the same size as the print range (the dotted line at the outside of FIG. 4) in case that the marginless printing is performed on the paper having the A4 size is generated. The size of the print image is larger than that of the paper by a predetermined number of the dots in all directions.

In the example of FIG. 6, the 2 or 3 dot columns are added to the periphery of the supplied print image. In case that the marginless printing is performed on the paper of A4 size, the difference between the paper size and the size in the print range is about 3 mm at each periphery by the deviation of the supplied position of the paper in the print position. In this case, the print image modification unit 23 adds 47 (=3 mm÷25.4 mm/inch×400 dpi) dot columns to each periphery.

The print image modification unit 23 may generate the print image which is printed on the paper having A4 size without the margin by respectively adding the dot columns to the upper and lower sides of the supplied print mage and then by respectively adding the dot columns to the right and left side of the supplied print mage. In addition, for example, the print image modification unit 23 may generate the print image which is printed on the paper having A4 size without the margin by respectively adding the dot columns to the right and left sides of the supplied print image and then by respectively adding the dot columns to the upper and lower sides of the supplied print mage.

The print image modification unit 23 supplies the modified print image to the print control data generating unit 24.

In case that the margin printing is performed on the paper having A4 size, the printer driver unit 25 is operated in the margin printing mode. At this time, the print image generated by the print image generating unit 22 is directly supplied to the print control data generating unit 24. The size of the print image supplied to the print control data generating unit 24 is not larger than that of the paper.

If the print image is supplied from the print image generating unit 22 or the print image modification unit 23, the print control data generating unit 24 starts a print control data generating process. The print control data generating unit 24 performs a color converting process of converting a color component of the supplied print image into a color component of the printable ink or the toner of the printer 2, a half tone process of converting the image of the ink color or the toner color into the printing presence/absence data of the printed dot unit, and an interlace process of arranging the printing presence/absence data of the dot unit in order which is printed by the printer 2 and generates the print control data. The print control data generating unit 24 supplies the generated print control data to the communication I/F 38.

The communication I/F 38 of the computer 1 transmits the supplied print control data to the communication I/F 11 of the printer 2 through the cable 3. The communication I/F 11 of the printer 2 stores the received print control data in the communication buffer 12.

If the print control data is stored in the communication buffer 12, the control unit 13 of the printer 2 reads the stored print control data and starts the printing process based on the print control data. The print mechanism unit 14 feeds the paper having A4 size to the print position based on the control of the control unit 13 and applies the ink or the toner to the paper at the print position. In the case of the marginless printing, the print mechanism unit 14 applies the ink or the toner to the paper in the range larger than the size of the paper having A4 size, according to the print control data. At the result, the image selected by the image print unit 21 of the computer 1 is printed on the paper having A4 size which is discharged to the paper discharge tray of the printer 2 by the print mechanism unit 14 at the whole surface without the margin.

Figure 7A:
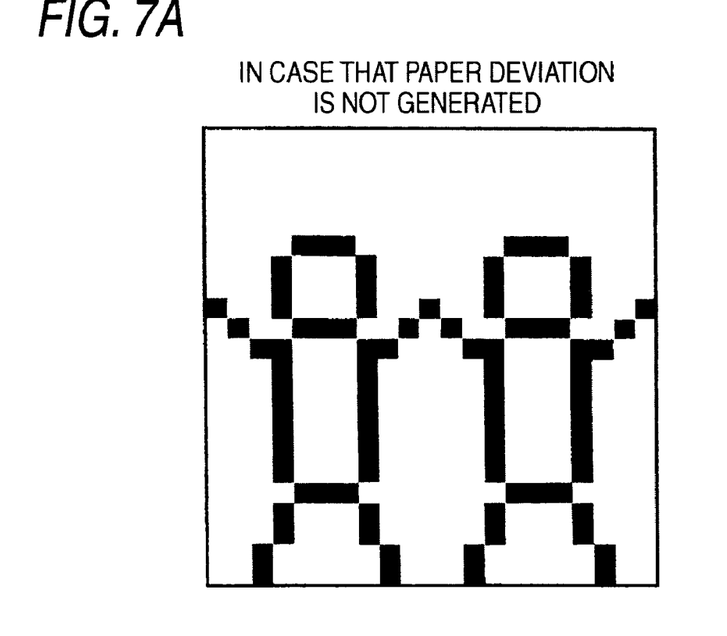
FIGS. 7A and 7B illustrate the paper which is printed without a margin.
Figure 7B:
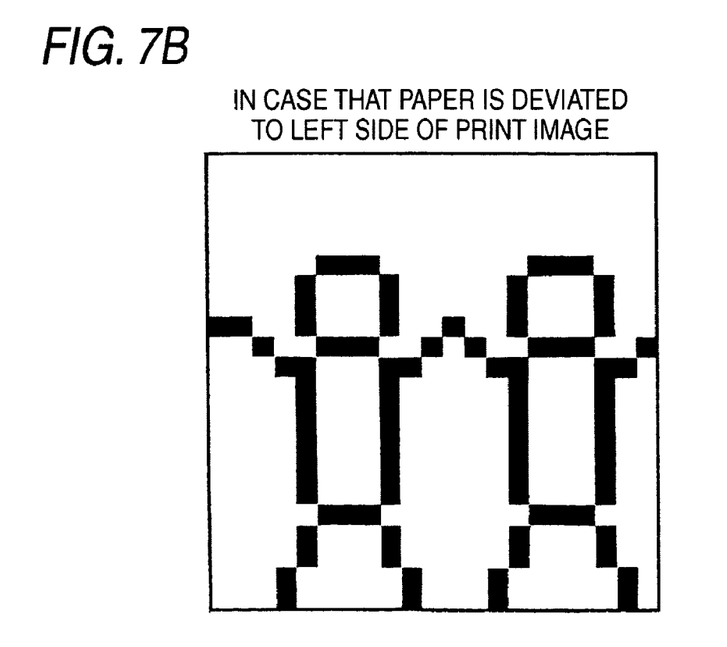

FIGS. 7A to 7B illustrates the paper which is printed without the margin in the print system according to the first embodiment. FIG. 7A illustrates the case that the paper deviation is not generated and FIG. 7B illustrates the case that the paper is deviated to the left side with respect to the print image.

As shown in FIG. 7A, in case that the marginless printing is performed in the print system according to the first embodiment, the print image generating unit 22 generates the print image having the same size as the selected paper. Accordingly, the print image generating unit 22 can prevent the periphery of the printed image from being not printed on the paper and can prevent the defect of the printed image, similar to the case that the print image having the size larger than that of the paper is generated.

Further, in case that the marginless printing is performed in the print system according to the first embodiment, the print image modification unit 23 of the printer driver unit 25 extrapolates the dot column of the periphery of the print image generated by the print image generating unit 22 to the vicinity of the print image and the printer 2 applies the ink or the toner to the paper based on the extrapolated print image.

Accordingly, as shown in FIG. 7B, even though the conveyance deviation of the paper occurs, the image continuous with the printed image is printed on the periphery of the paper.

Since the extrapolated portion is at most several millimeters and is the periphery of the paper, it is difficult to be viewed.

In addition, the frame (edge) which is not related to the printed image is not printed at the vicinity of the print image generated by the print image generating unit 22, as the case that a predetermined edge image is added.

As mentioned above, according to the first embodiment, although the print is deviated, the defect of the image is not generated and the image continuous with the printed image is printed on the periphery of the paper. Accordingly, the uncomfortable feeling is not given to the user.

According to the first embodiment, the print image modification unit 23 copies the dot column of the periphery of the print image generated by the print image generating unit 22 to the vicinity thereof. Thereby, the print image having the size larger than that of the print paper used in the marginless printing can be simply generated.

Further, in the first embodiment, the print image generating unit 22 generates the print image having the same size as the paper in case that the marginless printing is performed. In addition, for example, the print image generating unit 22 may generate the print image having the size not larger than that of the paper in case that the marginless printing is performed. In a modification example, the print image modification unit 23 may extrapolate the dot column of the periphery of the print image to the vicinity of the print image having the size not larger than that of the paper and generate the print image having the same size as the print range when the marginless printing is performed.

Particularly, in case that the marginless printing is performed, the print image generating unit 22 may generate the print image having the same size as the case that the margin printing is performed. In this case, the print image generating unit 22 can generate the print image from the image file 41 using the same process whether the marginless printing or the margin printing is performed. At the result, the image print program 42 is easily prepared.

Second Embodiment

In the print system according to a second embodiment of the present invention, the size of the print image generated by the print image generating unit 22 in case that the marginless printing is performed is equal to that of the case that the margin printing is performed.

Figure 8:
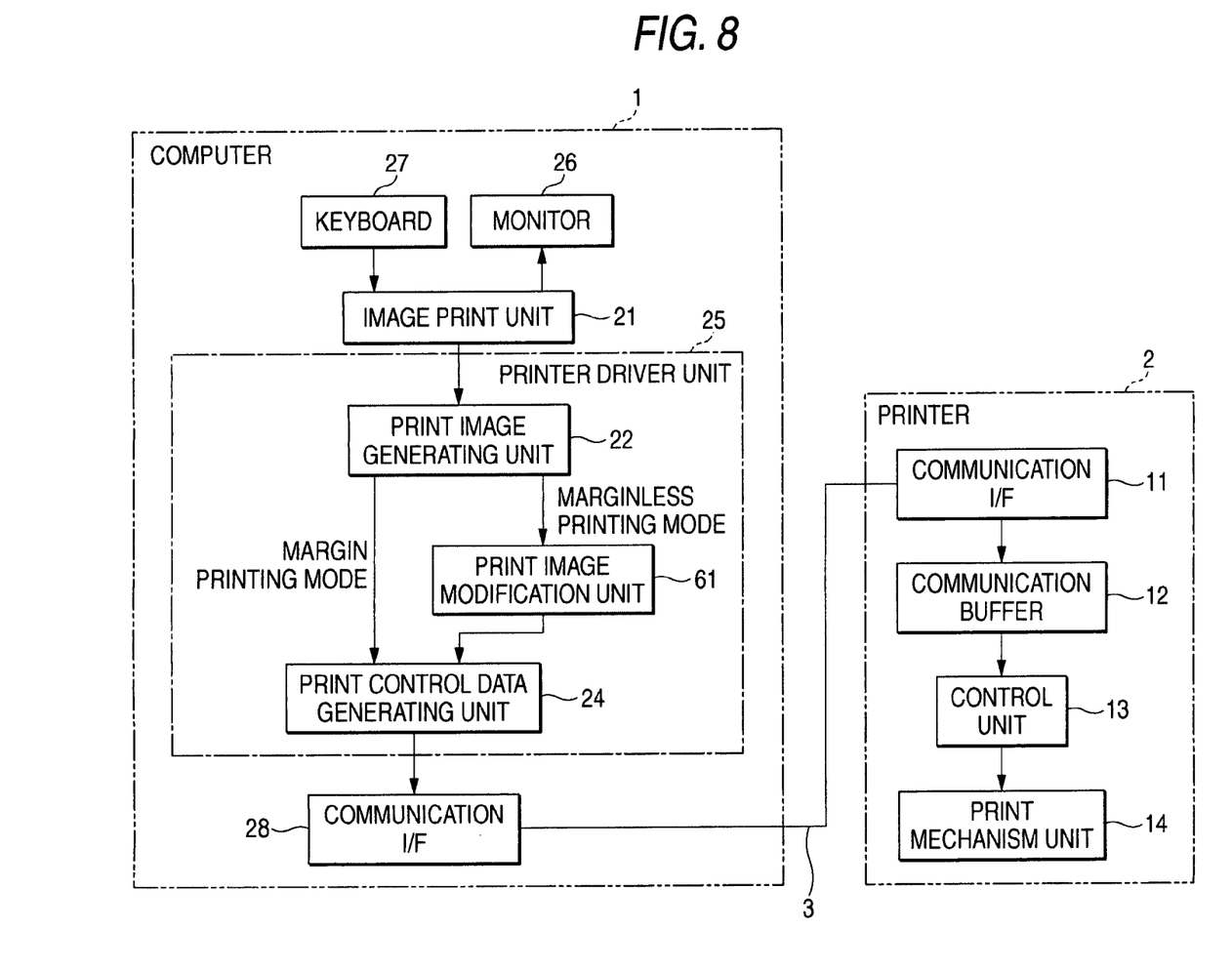
FIG. 8 is a block diagram of a print system according to a second embodiment.

FIG. 8 is a block diagram of the print system related to the second embodiment.

In the print system according to the second embodiment, a printer driver unit 25 having a print image modification unit 61 as the print image modification unit and a print control data generating unit 24 as the print control data generator is realized in the computer 1, by executing a printer driver program 43 by a central processing unit 31.

In the second embodiment, the print image generating unit 22 generates the print image having the size not larger than that of the paper selected by the print condition for each the size of the paper, whether the margin printing or the marginless printing is performed.

The print image modification unit 61 modifies the print image in the marginless printing mode. The print image modification unit 61 extrapolates the vicinity of the print image with the below-mentioned compensating data and generates the print image having the size of the print range (the two-dotted chain line of FIG. 4) in case the marginless printing is performed on the paper having A4 size as the modified print image.

In the print system related to the second embodiment, the components of the print system except for the above-mentioned structure have the same function as the components of the first embodiment and are marked with the same reference numerals as the first embodiment and the description thereof is omitted.

Next, the operation of the print system will be described. In the below description, for example, the print process of printing the image stored in the storage device 33 on the paper having the A4 size without the margin will be described.

In the second embodiment, based on the printed image and the print condition which are specified by the image print unit 21 of the computer 1, the print image generating unit 22 generates the print image.

Figure 9A:
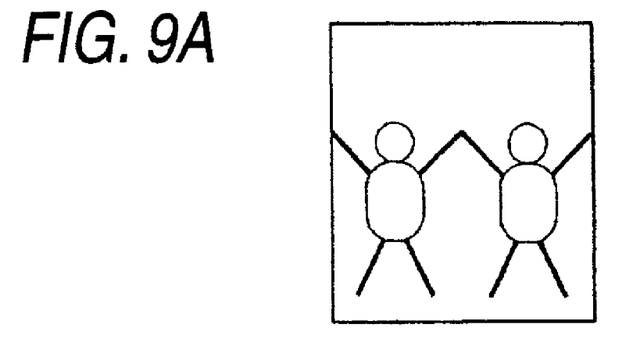
FIGS. 9A to 9C illustrate a correspondence relationship between a printed image and various print images.
Figure 9B:
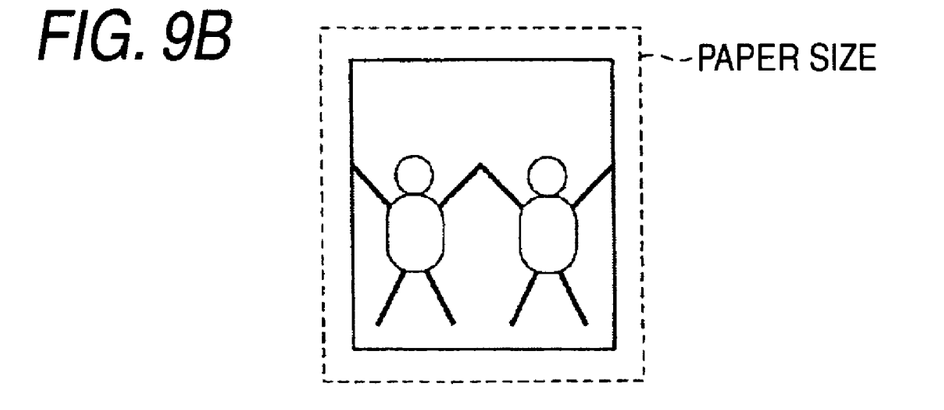
Figure 9C:
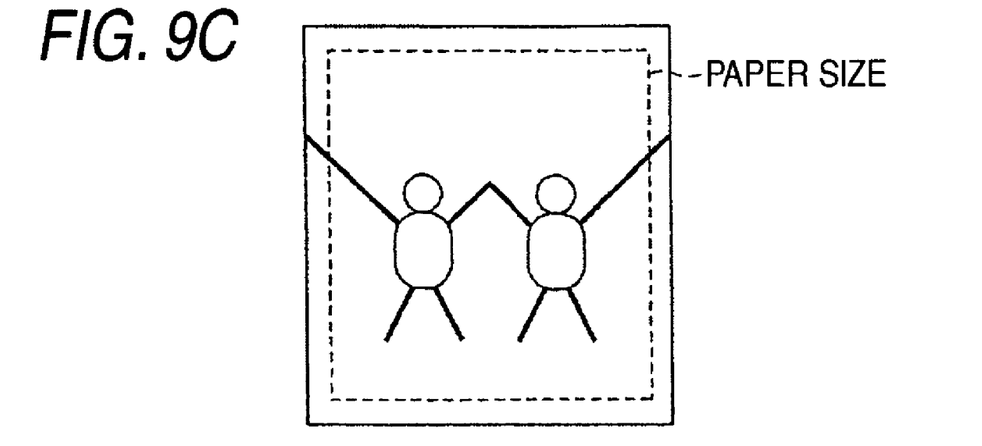

FIGS. 9A to 9C illustrate the correspondence relationship between the image to be printed and various print images generated based on the image. FIG. 9A is the printed image, FIG. 9B is the print image generated by the print image generating unit 22, and FIG. 9C is the print image modified by the print image modification unit 23 in case that the marginless printing is performed on the paper having A4 size. In FIGS. 9B and 9C, the size of the paper is shown by the dotted line.

As shown in FIG. 9B, the print image generating unit 22 generates the print image having size not larger than that of the paper having A4 size selected in the print condition, whether the margin printing or the marginless printing is performed.

The print image modification unit 61 modifies the print image generated by the print image generating unit 22 in the case of the marginless printing. Concretely, for example, the print image modification unit 61 extracts dot patterns each having the plural columns of the upper, lower, left, and right peripheries from the supplied print image, compares the extracted dot pattern with a predetermined pattern and extrapolates the image having a predetermined pattern generated according to the compared result to the vicinity of the print image.

Figure 10A:
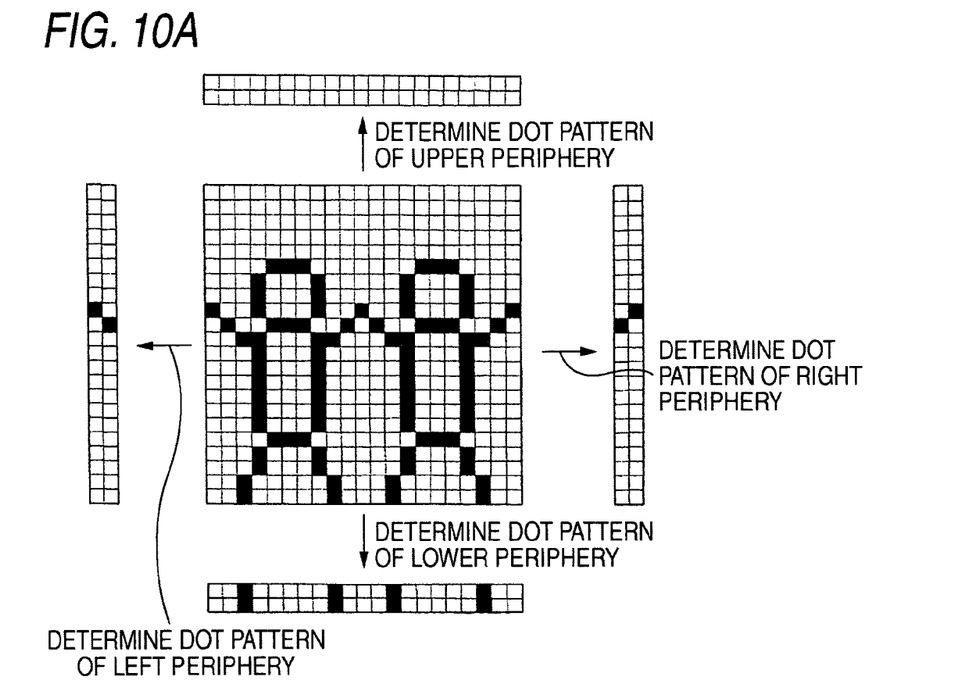
FIGS. 10A and 10B illustrates a print image process performed by the print image modification unit.
Figure 10B:
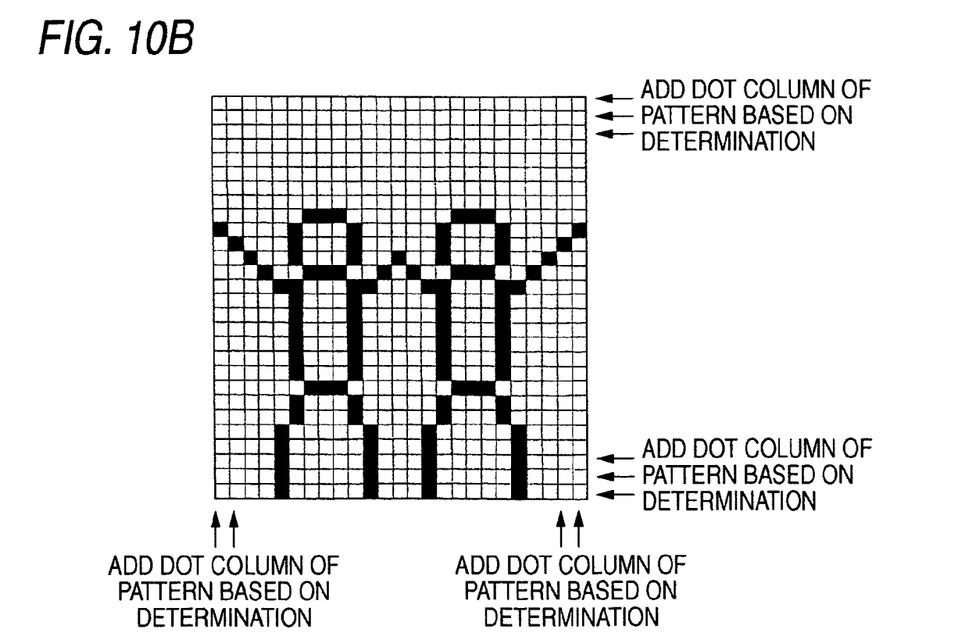

FIGS. 10A and 10B illustrates the print image process by the print image modification unit 61. FIG. 10A illustrates the print image generated by the print image generating unit 22 and a process of the print image modification unit 61 based on the print image. FIG. 10B illustrates the print image generated as a final print image by the print image modification unit 61 in the case of the marginless printing.

The two dot columns in the left periphery of FIG. 10A include a pattern having a diagonal line, which is downward sloping, representing the arm of a person. In this case, the print image modification unit 61 determines that the diagonal line pattern is included in the extracted dot pattern of the left periphery. The print image modification unit 61 generates an image having a pattern, which has a diagonal line obtained by extending the diagonal line representing the arm of the person in the direction of the line segment, and extrapolates the generated image to the left periphery of the supplied print image.

The dot pattern in the right periphery (the right line) of FIG. 10A includes a diagonal line pattern which is upward sloping representing the arm of a person. In this case, the print image modification unit 61 determines that the diagonal line pattern is included in the extracted dot pattern of the right periphery. The print image modification unit 61 generates an image having a pattern, which has a diagonal line obtained by extending the diagonal line representing the arm of the person in the direction of the line segment, and extrapolates the generated image to the right periphery of the supplied print image.

The dot pattern in the lower periphery (the lower line) of FIG. 10A includes four lines of which are downwardly extended by the foot of a person. In this case, the print image modification unit 61 determines that the vertical line pattern is included in the extracted dot pattern of the lower periphery. The print image modification unit 61 generates an image having a pattern, which has lines obtained by extending the lines in the directions of the line segments, and extrapolates the generated image to the lower periphery of the supplied print image.

The dot pattern in the upper periphery of FIG. 10A does not include the line segment pattern. In this case, the print image modification unit 61 determines that any line segment pattern is not included in the extracted dot pattern of the upper periphery. The print image modification unit 61 generates an image of a pattern not having any line segment and extrapolates the generated image to the upper periphery of the supplied print image.

By this process, the print image modification unit 61 extrapolates images generated based on the determination of the periphery to the periphery of the supplied print image, as shown in FIG. 10B and generates the modified print image. The size of print image generated by the print image modification unit 61 is larger than that of the A4 paper, as shown in FIG. 9C.

The print image modification unit 61 supplies the modified print image to the print control data generating unit 24.

In the case of the margin printing, the print image generated by the print image generating unit 22 is directly supplied to the print control data generating unit 24. The size of the print image supplied to the print control data generating unit 24 is not larger than that of the paper.

The print control data generating unit 24 generates the print control data based on the supplied print image and supplies it to the communication I/F 38. The communication I/F 38 transmits the supplied print control data to the communication I/F 11 of the printer 2 through the cable 3. The communication I/F 11 of the printer 2 stores the received print control data to the communication buffer 12.

The control unit 13 and the print mechanism unit 14 of the printer 2 perform the print based on the print control data stored in the communication buffer 12. Thereby, the image selected by the image print unit 21 of the computer 1 is printed at the whole surface without the margin.

As mentioned above, according to the second embodiment, the print image modification unit 61 compares the plurality of the dot columns of the periphery of the print image generated by the print image generating unit 22 with a predetermined pattern, generates the image having a predetermined pattern according to the comparison, and extrapolates the generated image to the periphery of the print image, thereby generating the print image having the size larger than that of the printed paper.

In the second embodiment, the print image generating unit 22 generates the print image having the size not larger than that of the paper in the case of the marginless printing, similar to the case of the margin printing. In addition, for example, the print image generating unit 22 may generate the print image having the same size as the paper. In the modification example, the print image modification unit 61 extrapolates the dot column of the image according to the pattern determination to the vicinity of the print image having the size of the paper and generates the print image having the same size as the print range in the case of the marginless printing.

The above-mentioned embodiments are exemplary, the present invention is not limited to these, and various modifications and changes may be made therein without departing from the spirit and scope of the present invention.

For example, in the first embodiment, the print image modification unit 23 copies and extrapolates the dot column of the periphery of the print image to the vicinity of the print image generated by the print image generating unit 22. In the second embodiment, the image of the pattern according to the dot pattern of the periphery of the print image is extrapolated to the vicinity of the print image generated by the print image generating unit 22. In addition, for example, the print image generating unit 22 may perform the post-process, such as the gradation, on the extrapolated portion after the extrapolating process. Thereby, the contour of the print image at the extrapolated portion is not noticed and thus the uncomfortable feeling generated in case that the extrapolated portion is printed can be suppressed in the whole image.

In each of the embodiments, the print image generated by the print image generating unit 22 is modified to the print image having the size larger than that of the paper by the print image modification unit 23 or 61 in the computer 1. In addition, for example, the print control data based on the print image having the same size is transmitted to the printer 2 whether there is the margin or not, and, in case that the marginless printing is performed in the printer 2, the print control data corresponding to the print image having the size larger than that of the print paper may be generated from the received print control data to perform the print.

The same unit as the printer driver unit 25 in the first and second embodiments may be assembled in the direct print type printer such as PictBridge for generating the print control data from the image file in the printer 2. In addition, for example, by providing a scanner for reading the image or a card leader for reading the semiconductor memory in the same case body as the printer 2, the image read by the scanner or the card leader may be printed without the margin by the printer 2. The print apparatus in which the card leader or the scanner is provided in the same case body as the printer 2 is called as a complexing apparatus.

In case that it is possible to modify the print image to the print image having the size larger than that of the paper in the printer 2, if the computer 1 related to each of the embodiments is connected to the printer 2, the process for modifying the print image to the print image for the marginless printing can be performed in both the computer 1 and the printer 2. In this case, the computer 1 notifies whether the data to be transmitted to the printer 2 is the data based on the print image after the modification or the data based on the print image before the modification. The printer 2 performs the modifying process and then performs the print, according to the notification.

In each embodiment, the size of the print image used in generating the print control data in the marginless printing is fixed to a predetermined size. In addition, for example, the size of the print image for the marginless printing used in generating the print control data can be changed to a certain size in the range larger than the size of the paper. For example, the print image generating unit 22 may vary the size of the print image according to the print conditions (for example, the condition such as the type of the paper, such as glossy paper or general paper) other than the marginless printing or the margin printing. Also, the print image modification units 23, 61 may vary the size of the print image generated by the modification process and the number of the dot columns extrapolated according to the set print condition.

The present invention can be used in the print system having marginless printing function.

What is claimed is:

1. A print control data generating apparatus comprising:
   a print image generator that generates a first print image having a size not larger than that of a print paper as a print image in a marginless printing;
   a print image modification unit that determines whether a periphery of the first print image includes at least one line pattern and that, if the periphery includes a line pattern, extrapolates an outside image including the line pattern to an outside of the first print image to generate a second print image having a size larger than that of the print paper; and
   a print control data generator that generates print control data used in print control of a printer based on the second print image;
   wherein the print image modification unit performs a gradation process on the extrapolated outside image after extrapolating the outside image to the outside of the first print image.

2. The apparatus according to claim 1, wherein the print image generator generates the first print image having the same size as that in a margin printing.

3. The apparatus according to claim 1, wherein if the periphery of the first print image does not include a line pattern, then the print image modification unit extrapolates the same images as the periphery of the first print image to the outside of the first print image to generate the second print image.

* * * * *